(12) United States Patent
Kim et al.

(10) Patent No.: US 10,673,319 B2
(45) Date of Patent: Jun. 2, 2020

(54) MODULAR MULTILEVEL CONVERTER SYSTEM

(71) Applicants: HYOSUNG HEAVY INDUSTRIES CORPORATION, Seoul (KR); Hee Jin Kim, Seoul (KR); Kyeon Hur, Seoul (KR)

(72) Inventors: Hee Jin Kim, Seoul (KR); Kyeon Hur, Seoul (KR); Dong Su Lee, Anyang-si (KR); Jae Sik Kang, Seoul (KR); Ju Yong Jung, Paju-si (KR); Sang Min Kim, Seoul (KR); Jong Seo Na, Seoul (KR)

(73) Assignees: HYOSUNG HEAVY INDUSTRIES CORPORATION, Seoul (KR); Hee Jin Kim, Seoul (KR); Kyeon Hur, Seoul (KR)

( * ) Notice: Subject to any disclaimer, the term of this patent is extended or adjusted under 35 U.S.C. 154(b) by 0 days.

(21) Appl. No.: 16/473,717

(22) PCT Filed: Dec. 5, 2017

(86) PCT No.: PCT/KR2017/014161
§ 371 (c)(1),
(2) Date: Jun. 26, 2019

(87) PCT Pub. No.: WO2018/124519
PCT Pub. Date: Jul. 5, 2018

(65) Prior Publication Data
US 2019/0356217 A1    Nov. 21, 2019

(30) Foreign Application Priority Data

Dec. 26, 2016    (KR) .................... 10-2016-0179553

(51) Int. Cl.
| | |
|---|---|
| H02M 1/32 | (2007.01) |
| H02M 1/08 | (2006.01) |
| H02M 5/458 | (2006.01) |

(52) U.S. Cl.
CPC ............... *H02M 1/32* (2013.01); *H02M 1/08* (2013.01); *H02M 5/4585* (2013.01); *H02M 2001/325* (2013.01)

(58) Field of Classification Search
CPC ............ H02M 1/32; H02M 1/34; H02M 1/08; H02M 1/088; H02M 5/4585; H02M 2001/325
See application file for complete search history.

(56) References Cited

U.S. PATENT DOCUMENTS

| | | |
|---|---|---|
| 2003/0183838 A1 | 10/2003 | Huang et al. |
| 2015/0357931 A1 | 12/2015 | Oates et al. |

(Continued)

FOREIGN PATENT DOCUMENTS

EP    2525483 A1    11/2012

OTHER PUBLICATIONS

Khan, Umer Amir et al., "Feasibility Analysis of a Novel Hybrid-type Superconducting Circuit Breaker in Multi-terminal HVDC Networks", Physica C. Superconductivity and Its Application, vol. 518, Nov. 15, 2015, pp. 154-158

*Primary Examiner* — Adolf D Berhane
(74) *Attorney, Agent, or Firm* — Novick, Kim & Lee, PLLC; Jae Youn Kim

(57) ABSTRACT

The present invention relates to an MMC converter system which can quickly cut off fault current by installing a plurality of disconnecting switch units on a line connected between two MMC converter devices. The MMC converter system comprises: a first MMC converter device including a plurality of serially connected sub modules; a second (Continued)

MMC converter device including a plurality of serially connected sub modules; a first disconnecting switch unit installed on a line between the first and second MMC converter devices; and a second disconnecting switch unit connected in series to the first disconnecting switch unit on the line, wherein each of the first and second disconnecting switch units comprises a mechanical switch installed on the line so as to open and close the line and a diode connected in parallel to the mechanical switch, and the two diodes are installed in opposite directions to each other.

11 Claims, 9 Drawing Sheets

(56) References Cited

U.S. PATENT DOCUMENTS

| | | | |
|---|---|---|---|
| 2017/0288569 A1* | 10/2017 | Uda | H02M 7/23 |
| 2017/0310237 A1* | 10/2017 | Uda | H02M 7/12 |
| 2017/0331393 A1* | 11/2017 | Whitehouse | H02M 1/36 |
| 2018/0034382 A1* | 2/2018 | Chivite Zabalza | H02M 7/483 |
| 2018/0069469 A1* | 3/2018 | Gupta | H02M 1/32 |
| 2018/0076619 A1* | 3/2018 | Gupta | H02J 1/02 |
| 2018/0076734 A1* | 3/2018 | Jimichi | H02M 1/32 |
| 2018/0166972 A1* | 6/2018 | Qi | H02M 7/483 |
| 2019/0207533 A1* | 7/2019 | Kikuchi | H02M 7/48 |
| 2019/0312504 A1* | 10/2019 | Kim | H02H 7/1257 |

* cited by examiner

MODULAR MULTILEVEL CONVERTER SYSTEM

TECHNICAL FIELD

The present invention relates to a modular multilevel converter (MMC) system and, more particularly, to an MMC converter system, in which a plurality of disconnecting switch units are provided in a line connected between two MMC converter devices, thereby enabling quickly cutting off DC fault current.

BACKGROUND ART

A modular multilevel converter device is a type of multilevel converter in which several sub-modules (SM) are connected in series to constitute a converter arm.

Such MMC converter device may exhibit a high voltage output and a high capacity output of the multilevel converter, and control the output voltage with stepped outputs.

The MMC converter device has advantages that a structure thereof is simple compared to that of the general multilevel converter and thus is easy to implement, and extra sub-modules are used thereby extending the life.

FIG. 1 is a configuration diagram showing a general MMC converter device.

The general MMC converter device includes, for example, three legs 13a, 13b, and 13c and six converter arms 11a, 11b, 11c, 12a, 12b, and 12c, each arm including a plurality of sub-modules connected in series with each other.

The converter arm may be configured with three upper arms 11a, 11b, and 11c and three lower arms 12a, 12b, and 12c. In the figure, for example, four sub-modules SM 10 are illustrated for each arm, but the number of sub-modules may be varied.

The MMC converter device converts a DC-side input voltage Vdc input through a bus into an AC-side output voltage through the three legs 13a, 13b, and 13c and outputs the AC-side output voltage. This output voltage varies depending on on/off states of sub-modules SM 10 included in each arm.

That is, for example, when four sub-modules are included in each of the upper arms and the lower arms, the output voltage may be adjusted according to the number of the sub-modules 10 in which the on state is maintained. Herein, it is possible to control the on/off states of the switch of each of sub-modules 10 in each arm in order to regulate the output voltage.

FIG. 2 is a view showing an example of a sub-module of a general MMC converter device.

Referring to FIG. 2, each of the sub-modules (SM) 10 includes a half bridge circuit having a pair of semiconductor switches 21 and a capacitor 22 connected in parallel to these semiconductor switches 21. The semiconductor switch 21 includes a power semiconductor element 21a and a diode 21b connected in anti-parallel therewith.

The MMC converter device in the related art has many countermeasures against AC faults, but has no countermeasures against DC faults. That is, in the case of a sub-module configured with a half bridge circuit in the related art, there is a problem that the fault current cannot be cut off because the fault current flows from the AC side only to the diode 21b when a DC fault occurs. In order to block the fault current, a sub-module configured with a full bridge circuit in the related art has been proposed.

FIG. 3 is a view showing another example of a sub-module of a general MMC converter device.

Referring to FIG. 3, each of the sub-modules SM includes a full bridge circuit having two pairs of semiconductor switches 31 connected in parallel to each other, and a capacitor 33 connected in parallel to the semiconductor switches 31. The semiconductor switch 31 includes a power semiconductor element 31a and a diode 31b connected in anti-parallel therewith.

As described above, in the case of the sub-module configured with the full bridge circuit, there is an advantage that the fault current can be cut off because a reverse voltage is applied across the capacitor 33 due to the fault current from the AC side at the occurrence of a DC fault, but there is a disadvantage that a loss due to the switching operation of the switch 31 is increased. In fact, when configuring a full bridge circuit other than the half bridge circuit using the same number of sub modules, a switching loss of about 30% or more is caused.

In addition, in the case of the MMC converter device of FIGS. 2 and 3, when a fault occurs in the line while two MMC converter devices are connected to each other through a line to transmit/receive power to/from each other, there are problems that it is difficult to quickly cut off the fault current on the DC line and a loss is caused.

DISCLOSURE

Technical Problem

Accordingly, the present invention has been made keeping in mind the above problems occurring in the related art, and an object of the present invention is to provide a MMC converter device system, which, upon transmitting/receiving power though a line between MMC converter device devices, quickly cuts off fault current occurring in the line and reduce a switching loss.

Technical Solution

A modular multilevel converter system according to the present invention includes a first MMC converter device including a plurality of sub modules connected in series with each other; a second MMC converter device including a plurality of sub modules connected in series with each other; a first disconnecting switch unit provided on a line between the first and second MMC converter devices; and a second disconnecting switch unit connected in series to the first disconnecting switch unit on the line, wherein the first and second disconnecting switch units respectively include mechanical switches provided on the line so as to open and close the line and diodes connected in parallel to the mechanical switches, and the two diodes are provided in opposite directions to each other.

The first and second disconnecting switch units may respectively include a serial connection of capacitors connected in parallel to the diodes and resistors.

When power is supplied from the first MMC converter device to the second MMC converter device, the mechanical switch of the first disconnecting switch unit may be closed and the mechanical switch of the second disconnecting switch unit may be opened so that the current output from the first MMC converter device flows to the second MMC converter device through the mechanical switch of the first disconnecting switch unit and the diode of the second disconnecting switch unit.

When power is supplied from the second MMC converter device to the first MMC converter device, the mechanical switch of the second disconnecting switch unit may be closed and the mechanical switch of the first disconnecting switch unit may be opened so that the current output from the second MMC converter device flows to the first MMC converter device through the mechanical switch of the second disconnecting switch unit and the diode of the first disconnecting switch unit.

The sub-modules in the first and second MMC converter devices respectively include capacitors storing energy; first semiconductor switches and second semiconductor switches connected in series with each other and connected in parallel to the capacitors; third semiconductor switches and fourth semiconductor switches connected in series with each other and connected in parallel to the capacitors; first output terminals connected to first intermediated points of the first semiconductor switches and the second semiconductor switches; second output terminals connected to any one of first switching terminals connected to second intermediate points of the third semiconductor switches and the fourth semiconductor switches, and second switching terminals connected to common points of the second semiconductor switches, the capacitors, and the fourth semiconductor switches; and switching units performing switching so that the second output terminal is connected to any one of the first switching terminals and the second switching terminals.

Herein, when power is supplied from the first MMC converter device to the second MMC converter device, the sub-modules of the first MMC converter device may be provided so that the second output terminal is connected to the first switching terminal by switching of the switching unit, and the sub-modules of the MMC converter device is provided so that the second output terminal is connected to the second switching terminal by switching of the switching unit.

Herein, when power is supplied from the second MMC converter device to the first MMC converter device, the sub-modules of the second MMC converter device are provided so that the second output terminal is connected to the first switching terminal by switching of the switching unit, and the sub-modules of the first MMC converter device are provided so that the second output terminal is connected to the second switching terminal by switching of the switching unit.

The first intermediate points may be respectively connected to emitter terminals of the first semiconductor switches and collector terminals of the second semiconductor switches.

The second intermediate points may be respectively connected to emitter terminals of the third semiconductor switches and collector terminals of the fourth semiconductor switches.

The common nodes may be respectively connected to emitter terminals of the second semiconductor switches, negative terminals of the capacitors, and emitter terminals of the fourth semiconductor switches.

When a fault occurs in the line while power is being supplied from the first MMC converter device to the second MMC converter device through the line, the sub-modules of the first MMC converter device may cut off the fault current flowing from the first MMC converter device to the line by allowing a sum of voltages of the sub-modules to form a reverse voltage in a state that the second output terminal and the first switching terminal are connected, and cut off the fault current flowing from the second MMC converter device to the line by the diode in a state that the mechanical switch of the second disconnecting switch unit is opened.

When a fault occurs in the line while power is being supplied from the second MMC converter device to the first MMC converter device through the line, the sub-modules of the second MMC converter device may cut off the fault current flowing from the second MMC converter device to the line by allowing a sum of voltages of the sub-modules to form a reverse voltage in a state that the second output terminal and the first switching terminal are connected, and cut off the fault current flowing from the first MMC converter device to the line by the diode in a state that the mechanical switch of the first disconnecting switch unit is opened.

Advantageous Effects

According to the present invention, in the MMC converter device system in which the first MMC converter device and the second MMC converter device transmit and receive power to/from each other through a line, since two disconnecting switch units are connected in series to the line, it is possible to cut off quickly the fault current by switching the disconnecting switch unit and switching the sub-modules of the first and second converter devices when the fault occurs in the line.

According to the present invention, since the sub-modules of the first and second MMC converter devices are switched differently from each other, the switching loss is lowered compared with the sub-modules of the full bridge circuit in the related art.

MODE FOR INVENTION

Hereinafter, some embodiments of the present invention will be described in detail with reference to exemplary drawings. In the following description of the embodiments of the present invention, when it is determined that a detailed description of known functions and configurations incorporated herein hinders understanding of the embodiments of the present invention, the detailed description will be omitted.

Figure 1:
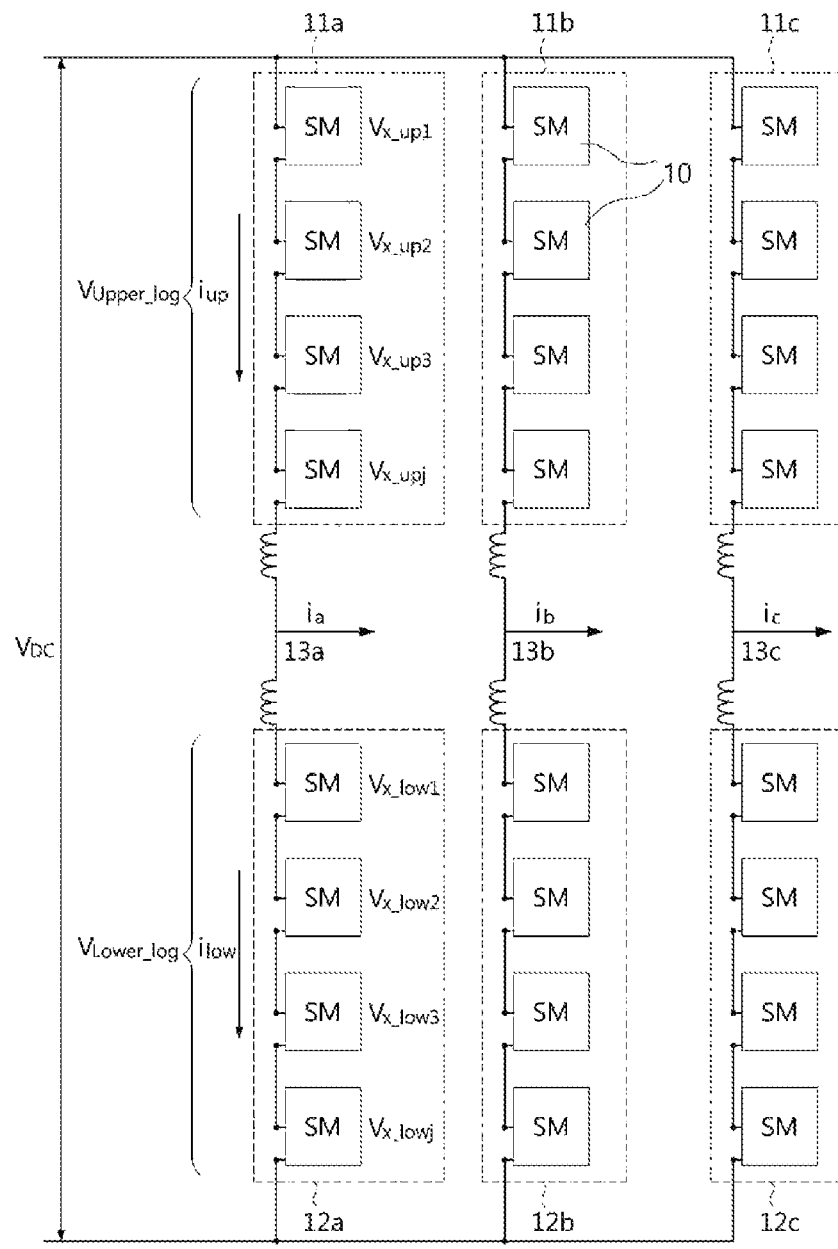
FIG. 1 is a configuration diagram showing a general MMC converter device.
Figure 2:
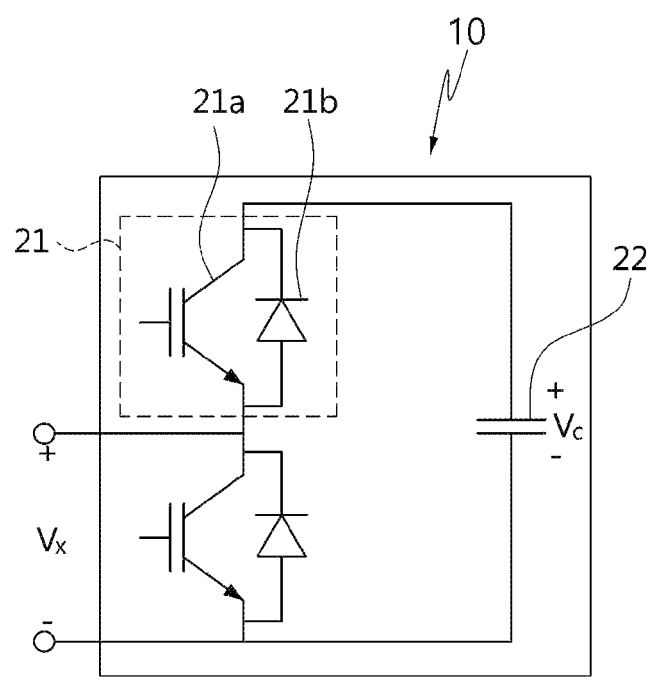
FIG. 2 is a diagram showing an example of a sub-module of a general MMC converter device.
Figure 3:
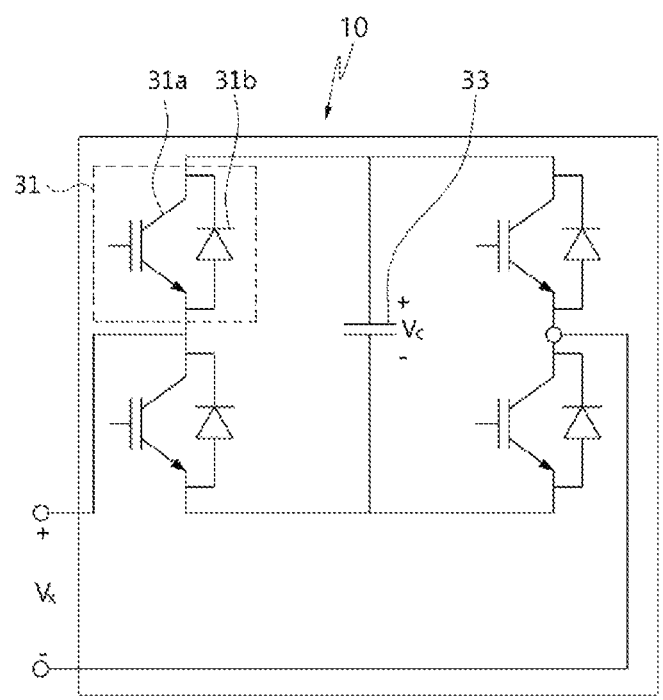
FIG. 3 is a diagram showing another example of a sub-module of a general MMC converter device.
Figure 4:
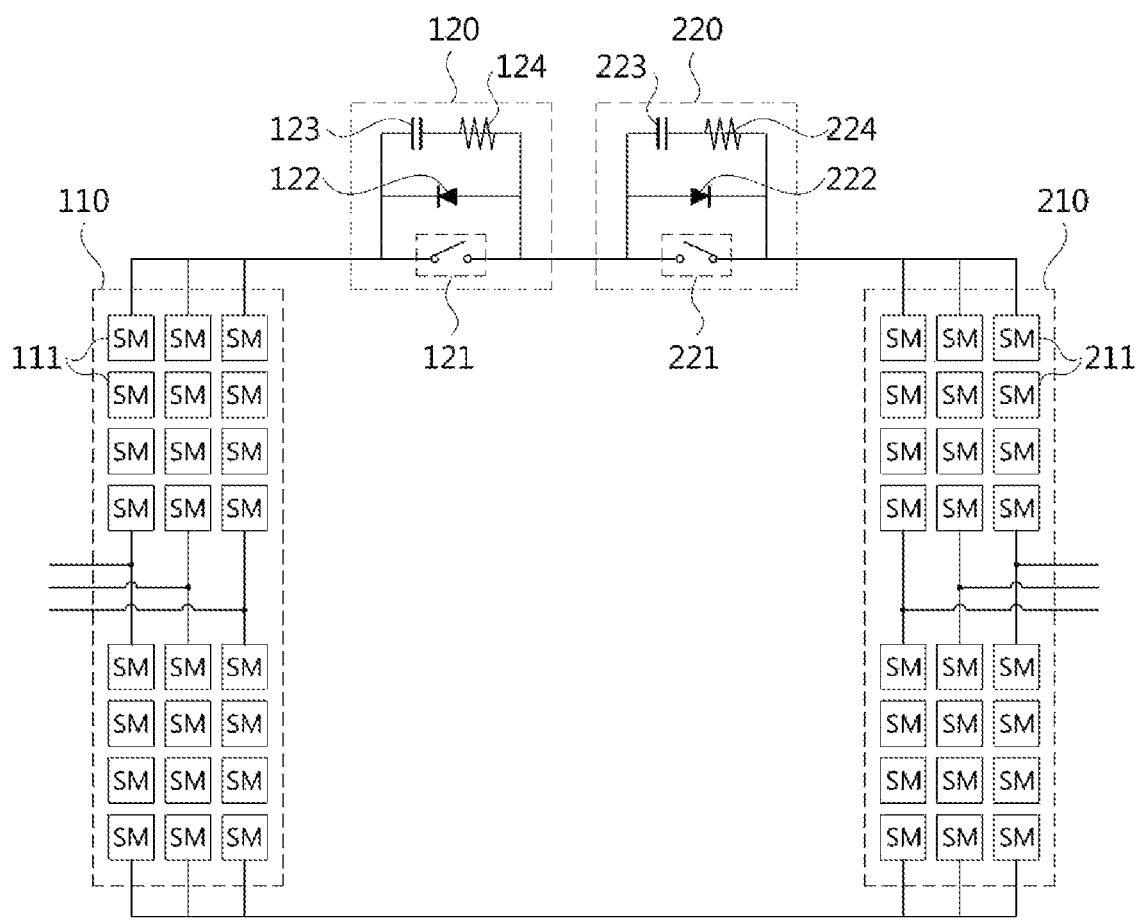
FIG. 4 is a configuration diagram showing an MMC converter system according to an embodiment of the present invention.

FIG. 4 is a configuration diagram showing an MMC converter system according to an embodiment of the present invention.

Referring to FIG. 4, an MMC converter system 100 according to the present invention includes a first MMC converter device 110, a first disconnecting switch unit 120, a second MMC converter device 210, and a second disconnecting switch unit 220.

The first MMC converter device 110 and the second MMC converter device 210 have the same configuration as each other. The first MMC converter device 110 includes a plurality of sub-modules 111 connected in series with each other, and the second MMC converter device 210 includes a plurality of sub-modules 211 connected in series with each other.

Specifically, the first MMC converter device 110 and the second MMC converter device 210 are each configured with a plurality of arms, and each of the arms has a plurality of sub-modules (SM) 111 and 211 connected in series with each other.

The first MMC converter device 110 and the second MMC converter device 210 are connected to a line 10 and transmit and receive power to/from each other through the line 10.

The first disconnecting switch unit 120 and the second disconnecting switch unit 220 are connected in series with each other in the line 10. The first disconnecting switch unit 120 and the second disconnecting switch unit 220 function to supply and cut off current to each other when the first MMC converter device 110 and the second MMC converter device 210 transmit and receive power to/from each other through the line 10. In particular, the first and second disconnecting switch units 121 and 221 function to cut off fault current when a fault occurs in the line 10.

As shown in the figure, the first and second disconnecting switch units 120 and 220 have the same configuration as each other. The first disconnecting switch unit 120 is configured to include a mechanical switch 121 installed on the line 10 for opening and closing the line 10 and a diode 122 connected in parallel to the mechanical switch 121, and the second disconnecting switch unit 220 is configured to include a mechanical switch 221 connected in series to the first disconnecting switch unit 120 and provided on the line 10 for opening and closing the line 10 and a diode 222 connected in parallel to the mechanical switch 221.

Herein, these two diodes 122 and 222 are provided in opposite directions to each other.

The first and second disconnecting switch units 120 and 220 may respectively include a series connection of capacitors 123 and 223 and resistors 124 and 224 connected in parallel to the diodes 122 and 222.

Figure 5:
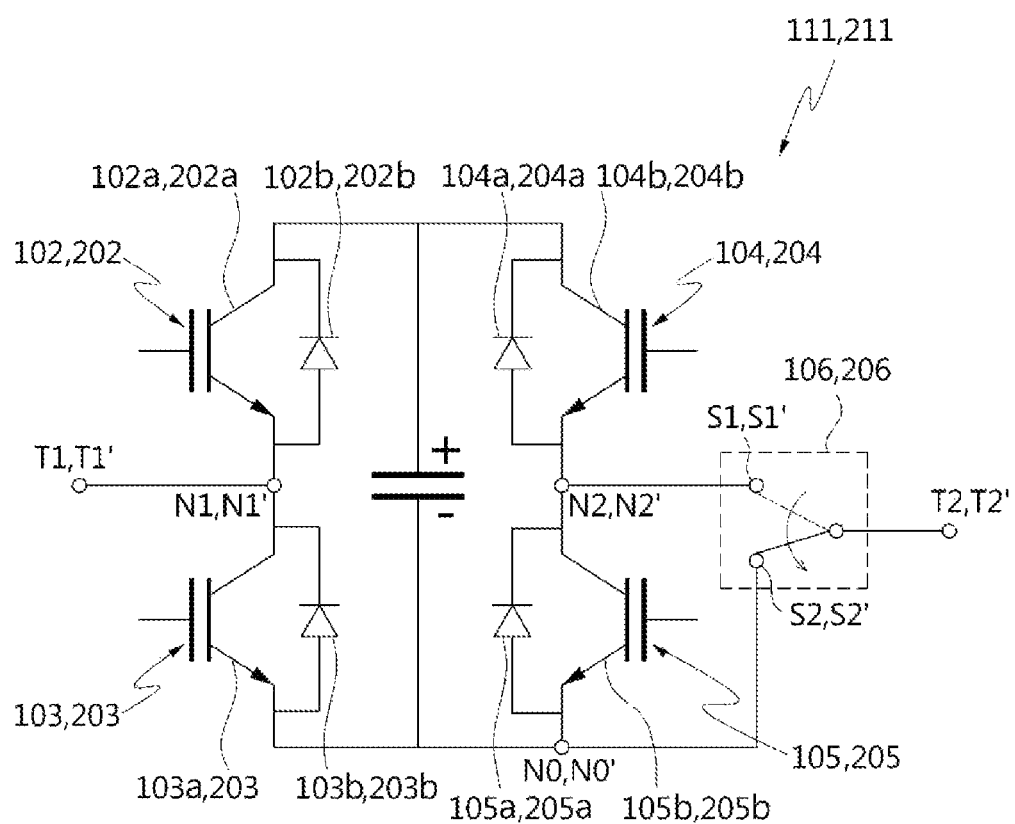
FIG. 5 is an exemplary diagram showing a sub-module applied to an MMC converter system according to an embodiment of the present invention.

FIG. 5 is an exemplary diagram showing a sub-module applied to an MMC converter system according to an embodiment of the present invention.

Referring to FIG. 5, the sub-modules 111 and 211 in the first and second MMC converter devices 110 and 210 according to the present invention have the same configuration as each other. Specifically, the sub-modules 111 and 211 include respectively capacitors 101 and 201 for storing energy, first semiconductor switches 102 and 202 and second semiconductor switches 103 and 203 connected in series with each other and connected in parallel to the capacitors 101 and 201, third semiconductor switches 104 and 204 and fourth semiconductor switches 105 and 205 connected in series with each other and connected in parallel to the capacitors 101 and 201, first output terminals T1 and T1' connected to first intermediated points N1 and N1' of the first semiconductor switches 102 and 202 and the second semiconductor switches 103 and 203, second output terminals T2 and T2' connected to any one of first switching terminals S1 and S1' connected to the second intermediate points N2 and N2' of the third semiconductor switches 104 and 204 and the fourth semiconductor switches 105 and 205 and second switching terminals S2 and S2' connected to common points N0 and N0' of the second semiconductor switches 103 and 203, the capacitors 101 and 201, and the fourth semiconductor switches 105 and 205, and switching units 106 and 206 for performing switching so that the second output terminal T2 and T2' are connected to any one of the first switching terminals S1 and S1' and the second switching terminals S2 and S2'. As shown in the figure, the first to fourth semiconductor switches 102 and 202 to 105 and 205 include respectively power semiconductor devices 102a and 202a to 105a and 205a and diodes 102b and 202b to 105b and 205b connected in anti-parallel therewith.

Specifically, each of the first to fourth semiconductor switches 102 and 202 to 105 and 205 includes a base terminal B, a collector terminal C, and an emitter terminal E. Herein, the first intermediate points N1 and N1' each are connected in common to emitter terminals E and E' of the first semiconductor switches 102 and 202 and collector terminals C and C' of the second semiconductor switches 103 and 203.

In addition, the second intermediate points N2 and N2' are respectively connected in common to emitter terminals E and E' of the third semiconductor switches 104 and 204 and collector terminals C and C' of the fourth semiconductor switches 105 and 205.

In addition, the common points N0 and N0' each are connected in common to emitter terminals E and E' of the second semiconductor switches 103 and 203, negative terminal of the capacitors 101 and 201, and emitter terminals of the fourth semiconductor switches 105 and 205.

With this configuration, whether or not the third semiconductor switches 104 and 204 and the fourth semiconductor switches 105 and 205 are used is determined according to switching operations of the switching units 106 and 206. That is, when the second output terminals T2 and T2' are connected to the second switching terminals S2 and S2' by switching operation of the switching units 106 and 206, the current does not flow through the third semiconductor switches 104 and 204 and the fourth semiconductor switches 105 and 205, whereby on/off control on the same is unnecessary. Conversely, when the second output terminals T2 and T2' are connected to the first switching terminals S1 and S1' by switching operation of the switching units 106 and 206, the current flows through the third semiconductor switches 104 and 204 and the fourth semiconductor switches 105 and 205, whereby the switching operation of the third semiconductor switches 104 and 204 and the fourth semiconductor switches 105 and 205 by a control unit (not shown) is necessary.

In the present invention, the first to fourth semiconductor switches 102 and 202 to 105 and 205 may be, for example, IGBTs, FETs, etc., and the switching operation thereof is controlled by a control unit (not shown).

In the MMC converter devices 110 and 210 configured as described above, when a fault such as a short circuit occurs in the line 10, fault current (hereinafter referred to as DC fault current) from the AC side to the DC side flows into the plurality of sub-modules 101 and 201 constituting each of the converter arms.

Therefore, when a fault occurs in the line 10, since the DC fault current flowing into each of the sub-modules 101 and 201 of the converter arm is large, the internal elements of the sub-modules 101 and 201 may be damaged. According to the MMC converter system 100 of the present invention, when a fault occurs in the line 10, the line 10 is opened by the first disconnecting switch unit 120 and the second disconnecting switch unit 220 to cut off the DC fault current, thereby protecting the first and second MMC converter devices 110 and 210.

In addition, the sub-modules 111 and 211 of the first and second MMC converter devices 110 and 210 may cut off the DC fault current according to the switching operation of each of the switching units 106 and 206. That is, the switching units 106 and 206 perform switching so that the second output terminals T2 and T2' are connected to the first switching terminals S1 and S1', to cause the current due to a reverse voltage stored in the capacitors 101 and 201 to be opposite in direction to DC fault current, thereby cutting off the DC fault current. This process of cutting off the fault current will be described in detail below.

Hereinafter, operations of the MMC converter system 100 of the present invention in a normal state will be described in detail with reference to FIGS. 6 and 7.

Figure 6:
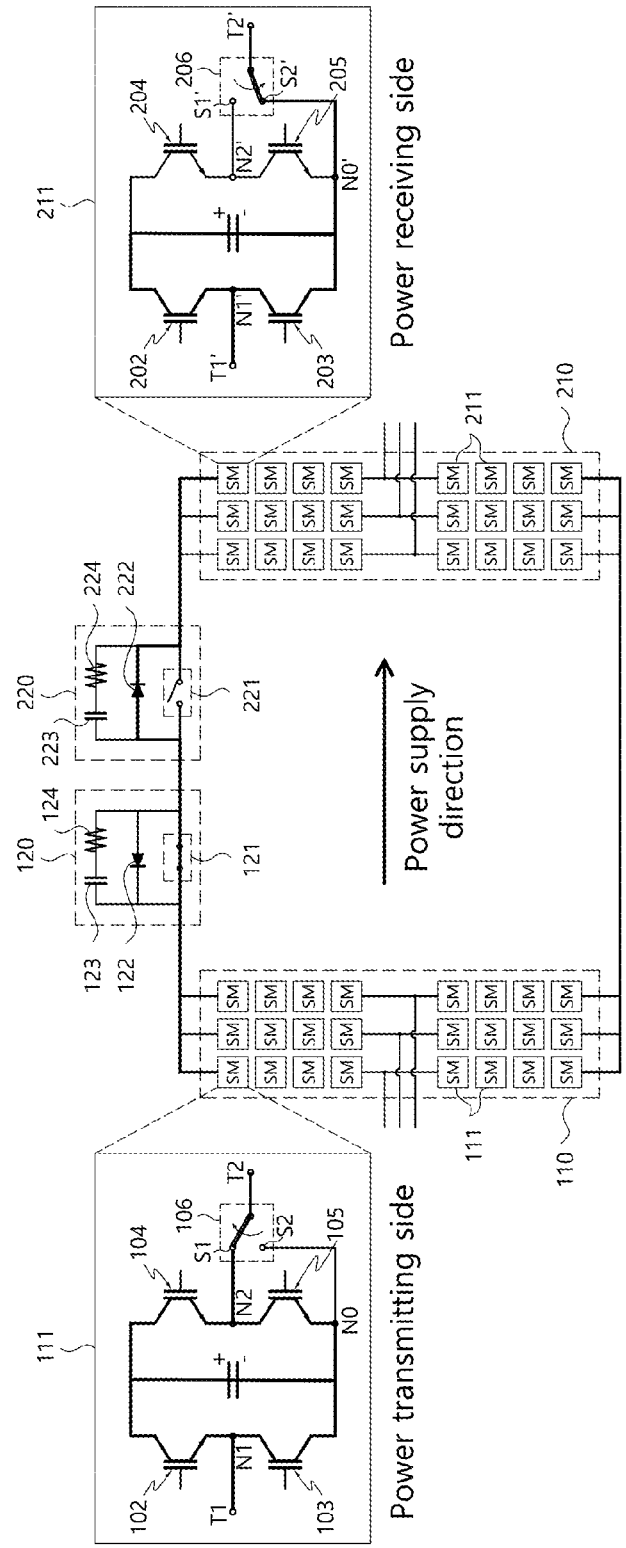
FIG. 6 is a diagram showing an operation example when power is supplied from a first MMC converter device to a second MMC converter device in a normal state in an MMC converter system according to an embodiment of the present invention.
Figure 7:
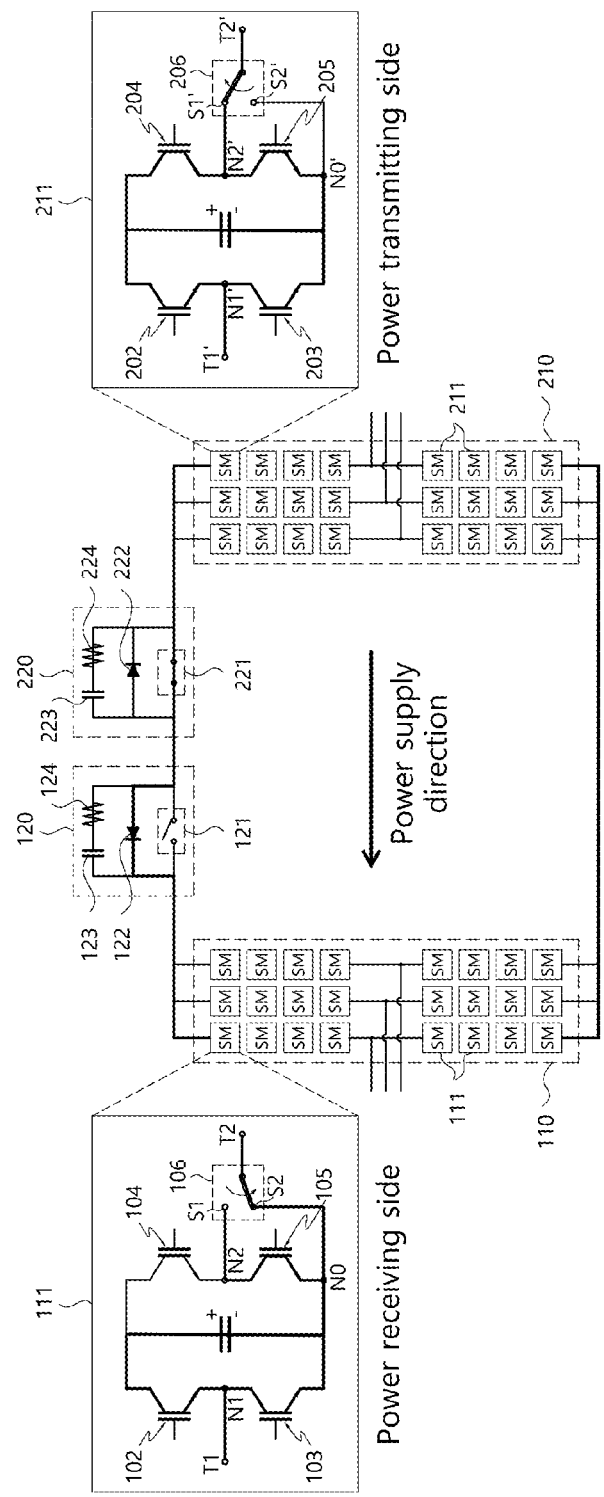
FIG. 7 is a diagram showing an operation example when power is supplied from a second MMC converter device to a first MMC converter device in a normal state in an MMC converter system according to an embodiment of the present invention.

FIG. 6 is a diagram showing an operation example when power is supplied from a first MMC converter device to a second MMC converter device in a normal state in an MMC converter system according to an embodiment of the present invention; and FIG. 7 is a diagram showing an operation example when power is supplied from a second MMC converter device to a first MMC converter device in a normal state in an MMC converter system according to an embodiment of the present invention.

Referring to FIG. 6, when supplying power from the first MMC converter device 110 to the second MMC converter device 210 in the MMC converter system 100 according to the present invention, the mechanical switch 121 of the first disconnecting switch unit 120 is closed and the mechanical switch 221 of the second disconnecting switch unit 220 is opened so that the current output from the first MMC converter device 110 flows into the second MMC converter device 210 through the mechanical switch 121 of the first disconnecting switch unit 120 and the diode 222 of the second disconnecting switch unit 220.

Herein, when power is supplied from the first MMC converter device 110 to the second MMC converter device 210, the sub-modules 111 of the first MMC converter device 110 are provided such that the second output terminal T2 is connected to the first switching terminal S1 by the switching unit 106, and the sub-modules 211 of the second MMC converter device 210 are provided such that the second output terminal T2' is connected to the second switching terminal S2' by the switching unit 206.

In this case, in terms of operations of the mechanical switches 121 and 221, the closing thereof is to cause the current to pass through by connecting the line 10, and the opening thereof is to cause the current not to pass through by cutting off the connection of the line 10.

Referring to FIG. 7, when power is supplied from the second MMC converter device 210 to the first MMC converter device 110 in the MMC converter system 100 according to the present invention, the mechanical switch 221 of the second disconnecting switch unit 220 is closed and the mechanical switch 212 of the first disconnecting switch unit 120 is opened so that the current output from the second MMC converter device 210 flows into the first MMC converter device 110 through the mechanical switch 221 of the second disconnecting switch unit 220 and the diode 122 of the first disconnecting switch unit 120.

Herein, when power is supplied from the second MMC converter device 210 to the first MMC converter device 110, the sub-module 211 of the second MMC converter device 210 is provided such that the second output terminal T2' is connected to the first switching terminal S1' by the switching unit 206, and the sub-module 111 of the first MMC converter device 110 is provided such that the second output terminal T2 is connected to the first switching terminal S2 by the switching unit 106.

Specifically, as shown in FIGS. 6 and 7, when the first MMC converter device 110 and the second MMC converter device 210 transmit and receive the power to/from each other through the line 10, switching operations of the switching units 106 and 206 are controlled so that the second output terminals T2 and T2' are connected to the first switching terminals S1 and S1' in a power transmitting side and the second output terminals T2 and T2' are connected to the second switching terminals S2 and S2' in a power receiving side.

Hereinafter, according to the MMC converter system 100 of the present invention, when a fault occurs in a line, a process of cutting off fault current will be described in detail.

Figure 8:
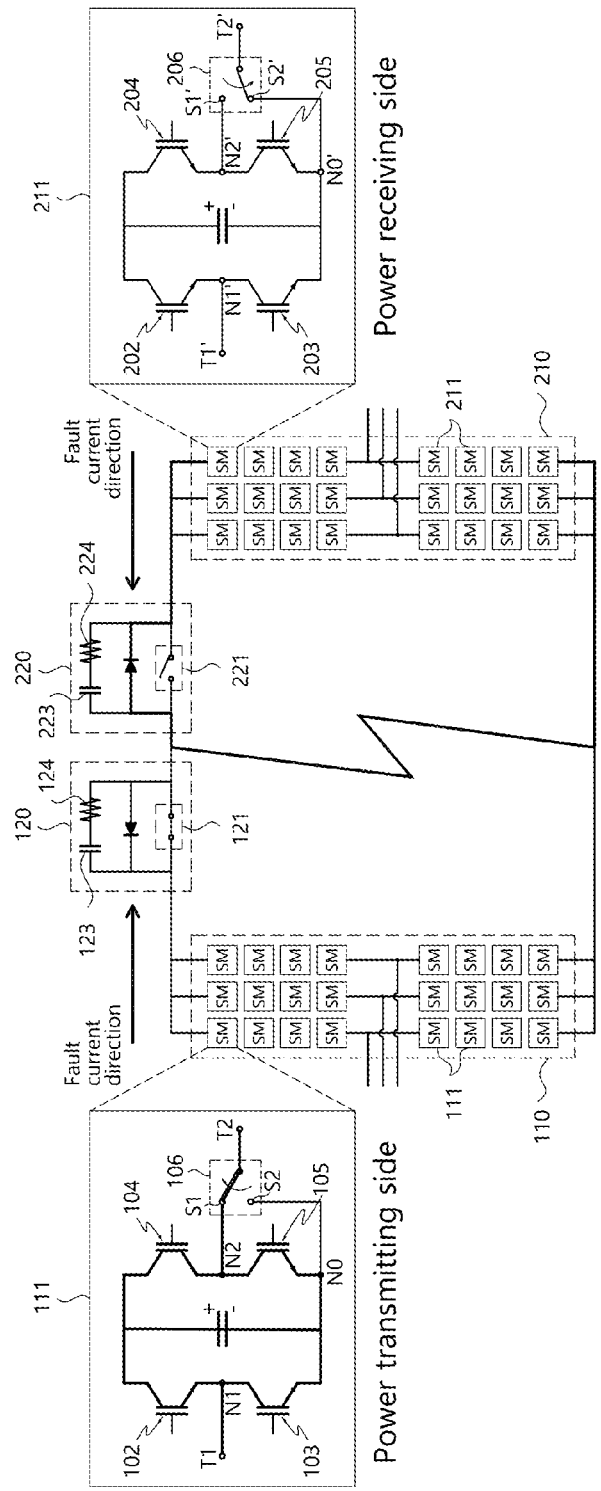
FIG. 8 is a diagram showing an exemplary operation for cutting off DC fault current when a fault occurs in a line while power is supplied from a first MMC converter device to a second MMC converter device in an MMC converter system according to an embodiment of the present invention.
Figure 9:
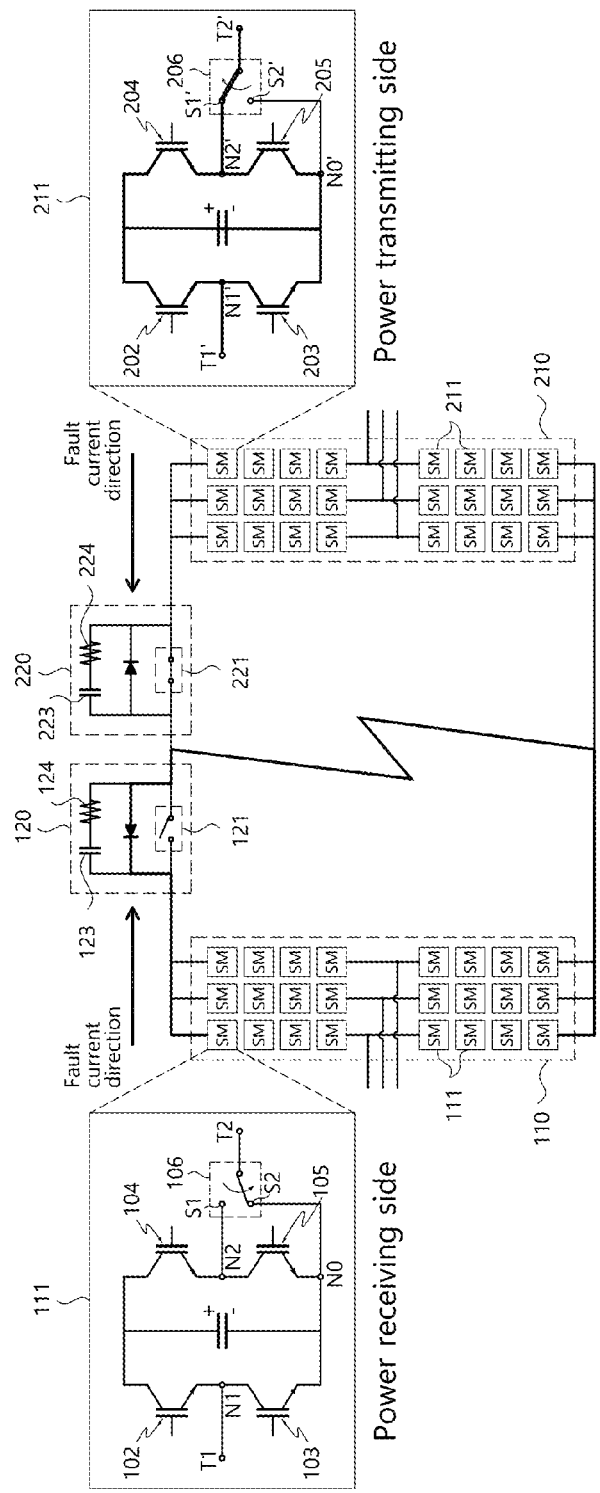
FIG. 9 is a diagram showing an exemplary operation for cutting off DC fault current when a fault occurs in a line while power is supplied from a second MMC converter device to a first MMC converter device in an MMC converter system according to an embodiment of the present invention.

FIG. 8 is a diagram showing an exemplary operation for cutting off DC fault current when a fault occurs in a line while power is supplied from a first MMC converter device to a second MMC converter device in an MMC converter system according to an embodiment of the present invention; and FIG. 9 is a diagram showing an exemplary operation for cutting off DC fault current when a fault occurs in a line while power is supplied from a second MMC converter device to a first MMC converter device in an MMC converter system according to an embodiment of the present invention.

When a fault such as a short circuit occurs in the line 10 between the first MMC converter device 110 and the second MMC converter device 210, a process of cutting off the DC fault current to protect the first and second MMC converter devices 110 and 210 is shown in FIGS. 8 and 9.

First, referring to FIG. 8, when a fault occurs in the line 10 while supplying power from the first MMC converter device 110 to the second MMC converter device 210 in the MMC converter system 100 as shown in FIG. 6, in the sub-module 111 of the first MMC converter device 110, the second output terminal T2 is connected to the first switching terminal S1 and the semiconductor switches 102 to 105 are all turned off so that the current is directed to the diodes 102b to 105b and a sum of the voltages of the plurality of sub-modules 111 forms a reverse voltage with respect to the line voltage of the AC system, thereby preventing the fault current from flowing from the first MMC converter device 110 to the line 10.

Herein, since power is supplied from the first MMC converter device 110 to the second MMC converter device 210, the mechanical switch 221 of the second disconnecting switch unit 220 has been already opened so that the fault current is prevented from flowing from the second MMC converter device 210 to the line 10 by the diode 222 in an opposite direction.

In this case, in the first MMC converter device 110 of the power transmitting side, the sub-modules 111 form the reverse voltage with respect to the AC voltage by the voltages charged in the capacitors 101 of the sub-modules 111, thereby cutting off the fault current, and in the second MMC converter device 210 of the power receiving side, the fault current is cut off by the diode 222 since the direction of the fault current is opposite to that of the diode 222 of the second disconnecting switch unit 220. Accordingly, since the fault current is cut off through the passive elements, it is possible to quickly cut off the fault current.

In addition, referring to FIG. 9, when a fault occurs in the line 10 while supplying power from the second MMC converter device 210 to the first MMC converter device 110 in the MMC converter system 100 as shown in FIG. 7, in the sub-module 211 of the second MMC converter device 210, the second output terminal T2' is connected to the first switching terminal S1' and the semiconductor switches 202 to 205 are all turned off so that the current is directed to the diodes 202b to 205b and a sum of the voltages of the plurality of sub-modules 211 forms a reverse voltage with respect to the line voltage of the AC system, thereby preventing the fault current from flowing from the second MMC converter device 210 to the line 10.

Herein, since power is supplying from the second MMC converter device 210 to the first MMC converter device 110, the mechanical switch 121 of the first disconnecting switch unit 120 has been already opened so that the fault current is prevented from flowing from the first MMC converter device 110 to the line 10 by the diode 122 in an opposite direction.

Similarly to FIG. 8, since the switching unit 206 of the sub-modules 211 of the second MMC converter device 210 is provided such that the second output terminal T2' is connected to the first switching terminal S1', the fault current to the first output terminal T1' and the second output terminal T2' is cut off by the voltage charged in the capacitor 201. That is, when a fault occurs in the line 10, since the reverse voltage is applied across the sub-modules 211 due to the fault current from AC side, the fault current may be cut off.

In this case, in the second MMC converter device 210 of the power transmitting side, the fault current is cut off by the reverse voltage charged in the capacitor 201 of the sub-module 211, and in the first MMC converter device 110 of the power receiving side, the fault current is cut off by the diode 122 since the direction of the fault current is opposite to that of the diode 122 of the first disconnecting switch unit 120. Accordingly, since the fault current is cut off through the passive elements, it is possible to quickly cut off the fault current.

As described above, according to the MMC converter system of the present invention, in which the first MMC converter device and the second MMC converter device transmit and receive power to/from each other via a line, since two disconnecting switch units are connected in series to the line, when a fault occurs in the line, it is possible to quickly cut off the fault current by switching the two disconnecting switch units and switching the sub-modules of the first and second converter devices.

In addition, according to the present invention, since the sub-modules of the first and second MMC converter devices are switched differently from each other, switching loss and conduction loss are lowered compared to the MMC converter device using the sub-modules of the full bridge circuit in the related art.

While the invention has been shown and described with reference to certain preferred embodiments thereof, it is to be understood that the invention is not limited to the disclosed embodiments. Those skilled in the art will appreciate that various modifications, additions and substitutions are possible, without departing from the scope of the appended claims. Accordingly, the true scope of the present invention should be determined by the technical idea of the appended claims.

The invention claimed is:

1. A modular multilevel converter system, comprising:
   a first MMC converter device (110) including a plurality of sub modules connected in series with each other;
   a second MMC converter device (210) including a plurality of sub modules connected in series with each other;
   a first disconnecting switch unit (120) provided on a line between the first and second MMC converter devices; and
   a second disconnecting switch unit (220) connected in series to the first disconnecting switch unit on the line,
   wherein the first and second disconnecting switch units (120 and 220) respectively include mechanical switches (121 and 221) provided on the line so as to open and close the line and diodes (122 and 222) connected in parallel to the mechanical switches (121 and 221), and the two diodes (122 and 222) are provided in opposite directions to each other,
   wherein the sub-modules (111 and 211) in the first and second MMC converter devices (110 and 210) respectively include:
   capacitors (101 and 201) storing energy;
   first semiconductor switches (102 and 202) and second semiconductor switches (103 and 203) connected in series with each other and connected in parallel to the capacitors;
   third semiconductor switches (104 and 204) and fourth semiconductor switches (105 and 205) connected in series with each other and connected in parallel to the capacitors;
   first output terminals (T1 and T1') connected to first intermediated points (N1 and N1') of the first semiconductor switches (102 and 202) and the second semiconductor switches (103 and 203);
   second output terminals (T2 and T2') connected to any one of first switching terminals (S1 and S1') connected to second intermediate points (N2 and N2') of the third semiconductor switches (104 and 204) and the fourth semiconductor switches (105 and 205), and second switching terminals (S2 and S2') connected to common points (NO and NO') of the second semiconductor switches (103 and 203), the capacitors (101 and 201), and the fourth semiconductor switches (105 and 205); and
   switching units (106 and 206) performing switching so that the second output terminals (T2 and T2') are connected to any one of the first switching terminals (S1 and S1') and the second switching terminals (S2 and S2').

2. The system of claim 1, wherein the first and second disconnecting switch units (120 and 220) respectively further include:
   a serial connection of capacitors (123 and 223) connected in parallel to the diodes (122 and 222) and resistors (124 and 224).

3. The system of claim 1, wherein when power is supplied from the first MMC converter device (110) to the second MMC converter device (210), the mechanical switch (121) of the first disconnecting switch unit (120) is closed and the mechanical switch (221) of the second disconnecting switch unit (220) is opened so that current output from the first MMC converter device (110) flows to the second MMC converter device (210) through the mechanical switch (121) of the first disconnecting switch unit (120) and the diode (222) of the second disconnecting switch unit (220).

4. The system of claim 1, wherein when power is supplied from the second MMC converter device (210) to the first MMC converter device (110), the mechanical switch (221) of the second disconnecting switch unit (220) is closed and the mechanical switch (121) of the first disconnecting switch unit (120) is opened so that current output from the second MMC converter device (210) flows to the first MMC converter device (110) through the mechanical switch (221) of the second disconnecting switch unit (220) and the diode (122) of the first disconnecting switch unit (120).

5. The system of claim 1, wherein when power is supplied from the first MMC converter device (110) to the second MMC converter device (210), the sub-modules (111) of the first MMC converter device (110) are provided so that the second output terminal (T2) is connected to the first switching terminal (S1) by switching of the switching unit (106), and the sub-modules (211) of the second MMC converter device (210) is provided so that the second output terminal (T2') is connected to the second switching terminal (S2') by switching of the switching unit (206).

6. The system of claim 1, wherein when power is supplied from the second MMC converter device (210) to the first MMC converter device (110), the sub-modules (211) of the second MMC converter device (210) are provided so that the second output terminal (T2') is connected to the first switching terminal (S1') by switching of the switching unit (206), and the sub-modules (111) of the first MMC converter device (110) are provided so that the second output terminal (T2) is connected to the second switching terminal (S2) by switching of the switching unit (106).

7. The system of claim 1, wherein the first intermediate points (N1 and N1') are respectively connected to emitter terminals (E and E') of the first semiconductor switches (102 and 202) and collector terminals (C and C') of the second semiconductor switches (103 and 203).

8. The system of claim 1, wherein the second intermediate points (N2 and N2') are respectively connected to emitter terminals (E and E') of the third semiconductor switches (104 and 204) and collector terminals (C and C') of the fourth semiconductor switches (105 and 205).

9. The system of claim 1, wherein the common nodes (NO and NO') are respectively connected to emitter terminals (E and E') of the second semiconductor switches (103 and 203), negative terminals of the capacitors (101 and 201), and emitter terminals (E and E') of the fourth semiconductor switches (105 and 205).

10. The system of claim 5, wherein when a fault occurs in the line (10) while power is being supplied from the first MMC converter device (110) to the second MMC converter device (210) through the line (10), the sub-modules (111) of the first MMC converter device (110) cuts off a fault current flowing from the first MMC converter device (110) to the line by allowing a sum of voltages of the sub-modules (111) to form a reverse voltage in a state that the second output terminal (T2) and the first switching terminal (S1) are connected, and cuts off the fault current flowing from the second MMC converter device (210) to the line by the diode (222) in a state that the mechanical switch (221) of the second disconnecting switch unit (220) is opened.

11. The system of claim 6, wherein when a fault occurs in the line (10) while power is being supplied from the second MMC converter device (210) to the first MMC converter device (110) through the line (10), the sub-modules (211) of the second MMC converter device (210) cuts off a fault current flowing from the second MMC converter device (210) to the line by allowing a sum of voltages of the sub-modules (211) to form a reverse voltage in a state that the second output terminal (T2') and the first switching terminal (S1') are connected, and cuts off the fault current flowing from the first MMC converter device (110) to the line by the diode (122) in a state that the mechanical switch (121) of the first disconnecting switch unit (120) is opened.

* * * * *